US008823268B2

(12) United States Patent
Saveri, III et al.

(10) Patent No.: US 8,823,268 B2
(45) Date of Patent: Sep. 2, 2014

(54) LOAD CONTROL DEVICE THAT IS RESPONSIVE TO DIFFERENT TYPES OF WIRELESS TRANSMITTERS

(75) Inventors: David T. Saveri, III, Macungie, PA (US); Andrew Peter Schmalz, Macungie, PA (US); Akshay Bhat, Allentown, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 172 days.

(21) Appl. No.: 13/469,581

(22) Filed: May 11, 2012

(65) Prior Publication Data

US 2012/0286676 A1    Nov. 15, 2012

Related U.S. Application Data

(60) Provisional application No. 61/485,934, filed on May 13, 2011.

(51) Int. Cl.
*H05B 37/02* (2006.01)

(52) U.S. Cl.
USPC ............ 315/149; 315/159; 315/152; 315/154

(58) Field of Classification Search
CPC ........... H05B 37/0218; H05B 37/0227; H05B 37/0245; H05B 37/0272; H05B 33/0854

USPC .......................... 315/149, 152, 154, 158, 159
See application file for complete search history.

(56) References Cited

U.S. PATENT DOCUMENTS

| | | | |
|---|---|---|---|
| 7,277,012 B2 * | 10/2007 | Johnston et al. ........... | 340/545.4 |
| 7,405,524 B2 * | 7/2008 | Null et al. ...................... | 315/308 |
| 8,035,529 B2 * | 10/2011 | Veskovic et al. .............. | 315/312 |
| 8,410,706 B2 * | 4/2013 | Steiner et al. ................. | 315/149 |
| 8,417,388 B2 * | 4/2013 | Altonen et al. ............... | 700/278 |
| 8,451,116 B2 * | 5/2013 | Steiner et al. ............... | 340/545.3 |
| 8,466,626 B2 * | 6/2013 | Null et al. ...................... | 315/159 |
| 8,571,719 B2 * | 10/2013 | Altonen et al. ............... | 700/287 |
| 2008/0315787 A1 | 12/2008 | Xu | |
| 2011/0029139 A1 * | 2/2011 | Altonen et al. ............... | 700/278 |

* cited by examiner

*Primary Examiner* — Vibol Tan
(74) *Attorney, Agent, or Firm* — Condo Roccia Koptiw LLP

(57) ABSTRACT

A load control system for controlling an electrical load includes multiple wireless transmitters and a load control device that is able to automatically adjust how the load control device operates in response to type of wireless transmitters that are associated with the load control device. The load control device automatically operates in a first mode of operation if only the first transmitter is associated with the load control device, and automatically operates in a second mode of operation if both the first and second transmitters are associated with the load control device. The first transmitter may comprise a daylight sensor, and the load control device may only turn on the electrical load in one of the two modes in response to the daylight sensor.

34 Claims, 9 Drawing Sheets

LOAD CONTROL DEVICE THAT IS RESPONSIVE TO DIFFERENT TYPES OF WIRELESS TRANSMITTERS

CROSS REFERENCES TO RELATED APPLICATIONS

This application is a non-provisional application of commonly-assigned U.S. Provisional Patent Application No. 61/485,934, filed May 13, 2011, entitled LOAD CONTROL DEVICE THAT IS RESPONSIVE TO DIFFERENT TYPES OF WIRELESS TRANSMITTERS, the entire disclosure of which is hereby incorporated by reference.

BACKGROUND OF THE INVENTION

1. Field of the Invention

The present invention relates to a load control device for controlling the amount of power delivered to an electrical load, such as a lighting load, and more particularly, to a load control device that is automatically configured to operate appropriately in response to the type of wireless transmitters (e.g., occupancy sensors, daylight sensors, or remote controls) associated with the load control device.

2. Description of the Related Art

Occupancy and vacancy sensors are often used to detect occupancy and/or vacancy conditions in a space in order to control an electrical load, such as, for example, a lighting load. Occupancy and vacancy sensors typically comprise internal detectors, such as, for example, a pyroelectric infrared (PIR) detector, and a lens for directing energy to the PIR detector for detecting the presence of the user in the space. Occupancy and vacancy sensors have often been provided in wall-mounted load control devices that are coupled between an alternating-current (AC) power source and an electrical load for control of the amount of power delivered to the electrical load. In addition, some prior art occupancy and vacancy sensors have been provided as part of lighting control systems. These sensors are typically coupled via a wired or wireless communication link to a lighting controller (e.g., a central processor) or a load control device, which then control the lighting loads accordingly.

Daylight sensors (i.e., photosensors) are often used to measure the total light intensity in a space in order to adjust the light intensity of the lighting load to thus adjust the total light intensity in the space. For example, the light intensity of the lighting load may be decreased as the total light intensity increases, and vice versa. Daylight sensors are typically mounted to a ceiling in the space at a distance from the window, and may be coupled via a wired or wireless communication link to a lighting controller or a load control device for controlling the lighting loads.

There is a need for a load control system that includes a load control device that is responsive to both wireless occupancy sensors and wireless daylight sensors, and that is easily configured to operate appropriately in response to the wireless occupancy and daylight sensors.

SUMMARY OF THE INVENTION

According to an embodiment of the present invention, a load control system for controlling an electrical load comprises a first transmitter operable to wirelessly transmit a first digital message, a second transmitter operable to wirelessly transmit a second digital message, and a load control device for controlling the load. The load control device is operable to be associated with one or both of the first and second transmitters, such that the load control device responsive to the first digital message if the load control device is associated with the first transmitter and to the second digital message if the load control device is associated with the second transmitter. The load control device automatically operates in a first mode of operation if only the first transmitter is associated with the load control device, and automatically operates in a second mode of operation if both the first and second transmitters are associated with the load control device.

In addition, a load control device for use in a load control system for controlling an electrical load in response to first and second transmitters is also described herein. The load control device comprises a wireless communication circuit adapted to receive a first digital message from the first transmitter and a second digital message from the second transmitter, and a controller adapted to be associated with one or both of the first and second transmitters. The controller is responsive to the first digital message if the load control device is associated with the first transmitter and to the second digital message if the load control device is associated with the second transmitter. The controller automatically operates in a first mode of operation if only the first transmitter is associated with the load control device, and automatically operates in a second mode of operation if both the first and second transmitters are associated with the load control device.

According to another embodiment of the present invention, a load control system for controlling the amount of power delivered from an AC power source to a lighting load comprises a daylight sensor operable to wirelessly transmit a first digital message, an occupancy sensor operable to wirelessly transmit a second digital message, and a load control device adapted to be coupled in series electrical connection between the source and the lighting load. The load control device has an actuator for turning the lighting load on and off, and is operable to be associated with one or both of the daylight sensor and the occupancy sensor. The load control device is responsive to the first digital message if the load control device is associated with the daylight sensor and to the second digital message if the load control device is associated with the occupancy sensor. The load control device automatically operates in a first mode of operation if only the daylight sensor is associated with the load control device, and automatically operates in a second mode of operation if both the daylight sensor and the occupancy sensor are associated with the load control device. The load control device does not turn on the lighting load in response to the first digital message transmitted by the daylight sensor in the first mode of operation when only the daylight sensor is associated with the load control device.

According to yet another embodiment of the present invention, a load control system for controlling the amount of power delivered from an AC power source to a lighting load comprises a daylight sensor operable to wirelessly transmit a first digital message, a remote control operable to wirelessly transmit a second digital message, and a load control device adapted to be coupled in series electrical connection between the source and the lighting load. The load control device is operable to be associated with one or both of the daylight sensor and the remote control, and is responsive to the first digital message if the load control device is associated with the daylight sensor and to the second digital message if the load control device is associated with the remote control. The load control device automatically operates in a first mode of operation if only the daylight sensor is associated with the load control device, and automatically operates in a second mode of operation if both the daylight sensor and the remote control are associated with the load control device. The load control device turns the lighting load on and off in response to the first digital message transmitted by the daylight sensor in the first mode of operation when only the daylight sensor is associated with the load control device.

Other features and advantages of the present invention will become apparent from the following description of the invention that refers to the accompanying drawings.

BRIEF DESCRIPTION OF THE DRAWINGS

The invention will now be described in greater detail in the following detailed description with reference to the drawings in which.

DETAILED DESCRIPTION OF THE INVENTION

Figure 1:
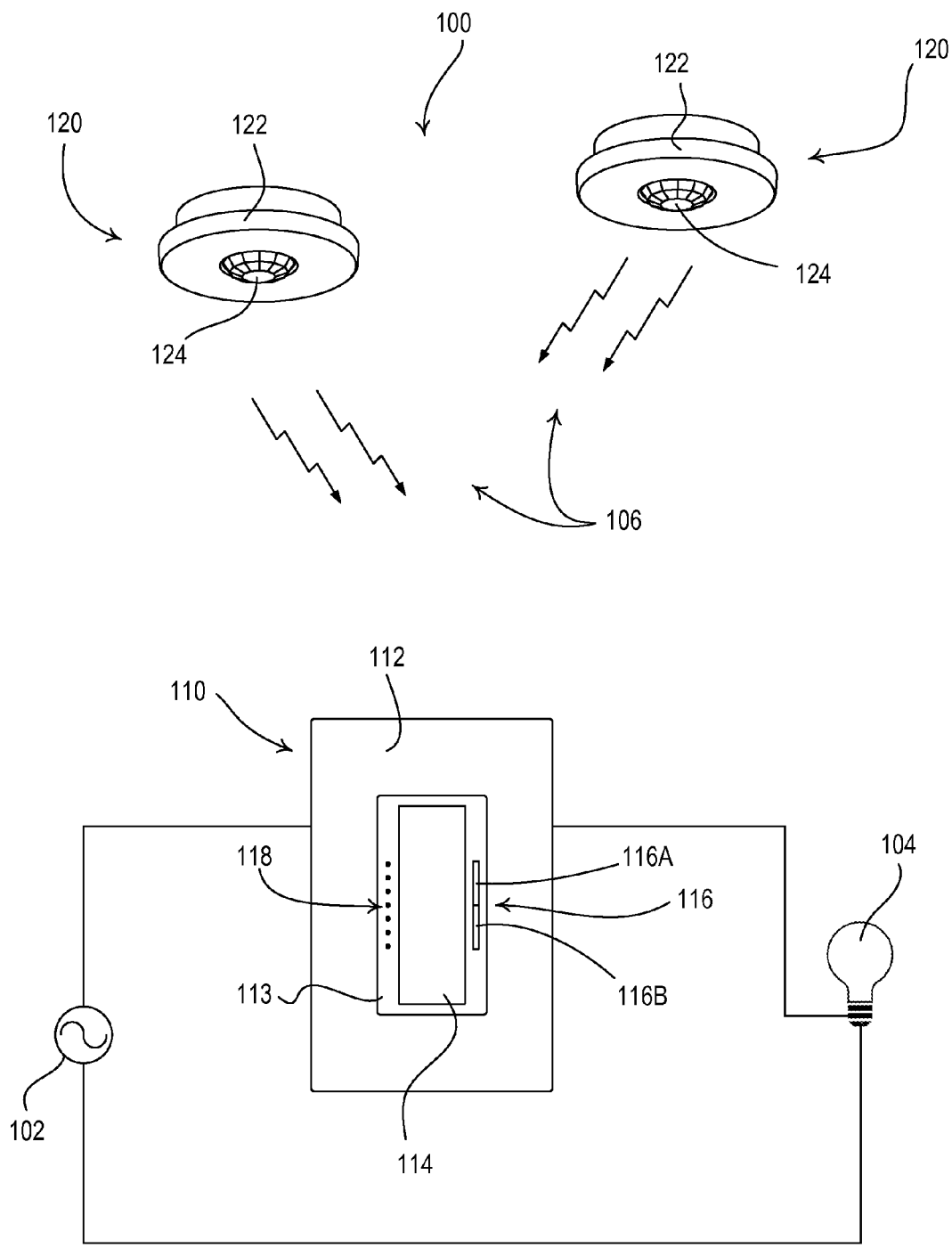
FIG. 1 is a simple diagram of a first configuration of a radio-frequency (RF) load control system according to a first embodiment of the present invention, in which the system comprises a dimmer switch and two remote occupancy sensors.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

According to a first embodiment of the present invention, a radio-frequency (RF) load control system 100 comprises a load control device, e.g., a dimmer switch 110, and one or more RF transmitters, such as remote occupancy sensors (OS) 120 and remote daylight sensors (DS) 130. The dimmer switch 110 is operable to automatically adjust how the dimmer switch 110 operates in response to the types of RF transmitters (i.e., occupancy sensors or daylight sensors) that are assigned to (i.e., associated with) the dimmer switch as will be described in greater detail below.

FIG. 1 is a simple diagram of a first configuration of an RF load control system 100, in which the system comprises the dimmer switch 110 and two remote occupancy sensors 120. The dimmer switch 110 is adapted to be coupled in series electrical connection between an AC power source 102 and a lighting load 104 for controlling the amount of power delivered to the lighting load. The dimmer switch 110 may be adapted to be wall-mounted in a standard electrical wallbox. Alternatively, the dimmer switch 110 could be implemented as a table-top load control device. The dimmer switch 110 comprises a faceplate 112 and a bezel 113 received in an opening of the faceplate. The dimmer switch 110 further comprises a toggle actuator 114, i.e., a button, and an intensity adjustment actuator 116. Actuations of the toggle actuator 114 toggle, i.e., turn off and on, the lighting load 104. Actuations of an upper portion 116A or a lower portion 116B of the intensity adjustment actuator 116 respectively increase or decrease the amount of power delivered to the lighting load 104 and thus increase or decrease the intensity of the lighting load 104 from a minimum intensity (e.g., approximately 1%) to a maximum intensity (e.g., approximately 100%). A plurality of visual indicators 118, e.g., light-emitting diodes (LEDs), are arranged in a linear array on the left side of the bezel 113. The visual indicators 118 are illuminated to provide feedback of the intensity of the lighting load 104. An example of a dimmer switch having a toggle actuator 114 and an intensity adjustment actuator 116 is described in greater detail in commonly-assigned U.S. Pat. No. 5,248,919, issued Sep. 29, 1993, entitled LIGHTING CONTROL DEVICE, the entire disclosure of which is hereby incorporated by reference.

The remote occupancy sensors 120 are removably mountable to a ceiling or a wall, for example, in the vicinity of (i.e., a space around) the lighting load 104 controlled by the dimmer switch 110, and are operable to detect occupancy conditions in the vicinity of the lighting load. The occupancy sensors 120 may be spaced apart to detect occupancy conditions in different areas of the vicinity of the lighting load 104. The remote occupancy sensors 120 each include an internal detector, e.g., a pyroelectric infrared (PIR) detector, which is housed in an enclosure 122. The enclosure 122 comprises a lens 124 provided in the enclosure. The internal detector is operable to receive infrared energy from an occupant in the space via the lens 124 to thus sense the occupancy condition in the space. The occupancy sensors 120 are operable to process the output of the PIR detector to determine whether an occupancy condition (i.e., the presence of the occupant) or a vacancy condition (i.e., the absence of the occupant) is presently occurring in the space, for example, by comparing the output of the PIR detector to a predetermined occupancy voltage threshold. Alternatively, the internal detector could comprise an ultrasonic detector, a microwave detector, or any combination of PIR detectors, ultrasonic detectors, and microwave detectors. The occupancy sensors 120 each operate in an "occupied" state or a "vacant" state in response to the detections of occupancy or vacancy conditions, respectively, in the space. If one of the occupancy sensors 120 is in the vacant state and the occupancy sensor determines that the space is occupied in response to the PIR detector, the occupancy sensor changes to the occupied state.

During a setup procedure of the first configuration of the RF load control system 100, the dimmer switch 110 may be assigned to one or more remote occupancy sensors 120. The remote occupancy sensors 120 transmit digital messages wirelessly via RF signals 106 to the dimmer switch 110 in response to the present state of the occupancy sensors. A message transmitted by the remote occupancy sensors 120 may include a command and identifying information, for example, a serial number (i.e., a unique identifier) associated with the transmitting occupancy sensor. The dimmer switch 110 is responsive to messages containing the serial numbers of the remote occupancy sensors 120 to which the dimmer switch is assigned. The commands included in the digital messages transmitted by the occupancy sensors 120 may comprise an occupied command or a vacant command. When the lighting load 104 is off, the dimmer switch 110 is operable to turn on the lighting load in response to receiving a first occupied command from any one of the occupancy sensors 120. The dimmer switch 110 is operable to turn off the lighting load 104 in response to the last vacant command received from those occupancy sensors 120 from which the occupancy sensor received either occupied or occupied commands. For example, if the occupancy sensors 120 both transmit occupied commands to the dimmer switch 110, the dimmer switch will not turn off the lighting load 104 until subsequent vacant commands are received from both of the occupancy sensors.

Alternatively, the occupancy sensors 120 could be implemented as vacancy sensors (VS). A vacancy sensor only operates to turn off the lighting load 104 when the vacancy sensor detects a vacancy in the space. Therefore, when using vacancy sensors, the lighting load 104 must be turned on manually (e.g., in response to a manual actuation of the toggle actuator 114). Examples of RF load control systems having occupancy and vacancy sensors are described in greater detail in commonly-assigned U.S. Pat. No. 7,940,167, issued May 10, 2011, entitled BATTERY-POWERED OCCUPANCY SENSOR; U.S. Pat. No. 8,009,042, issued Aug. 11, 2011, entitled RADIO-FREQUENCY LIGHTING CONTROL SYSTEM WITH OCCUPANCY SENSING; and U.S. patent application Ser. No. 12/371,027, filed Feb. 13, 2009, entitled METHOD AND APPARATUS FOR CONFIGURING A WIRELESS SENSOR, the entire disclosures of which are hereby incorporated by reference.

Figure 2:
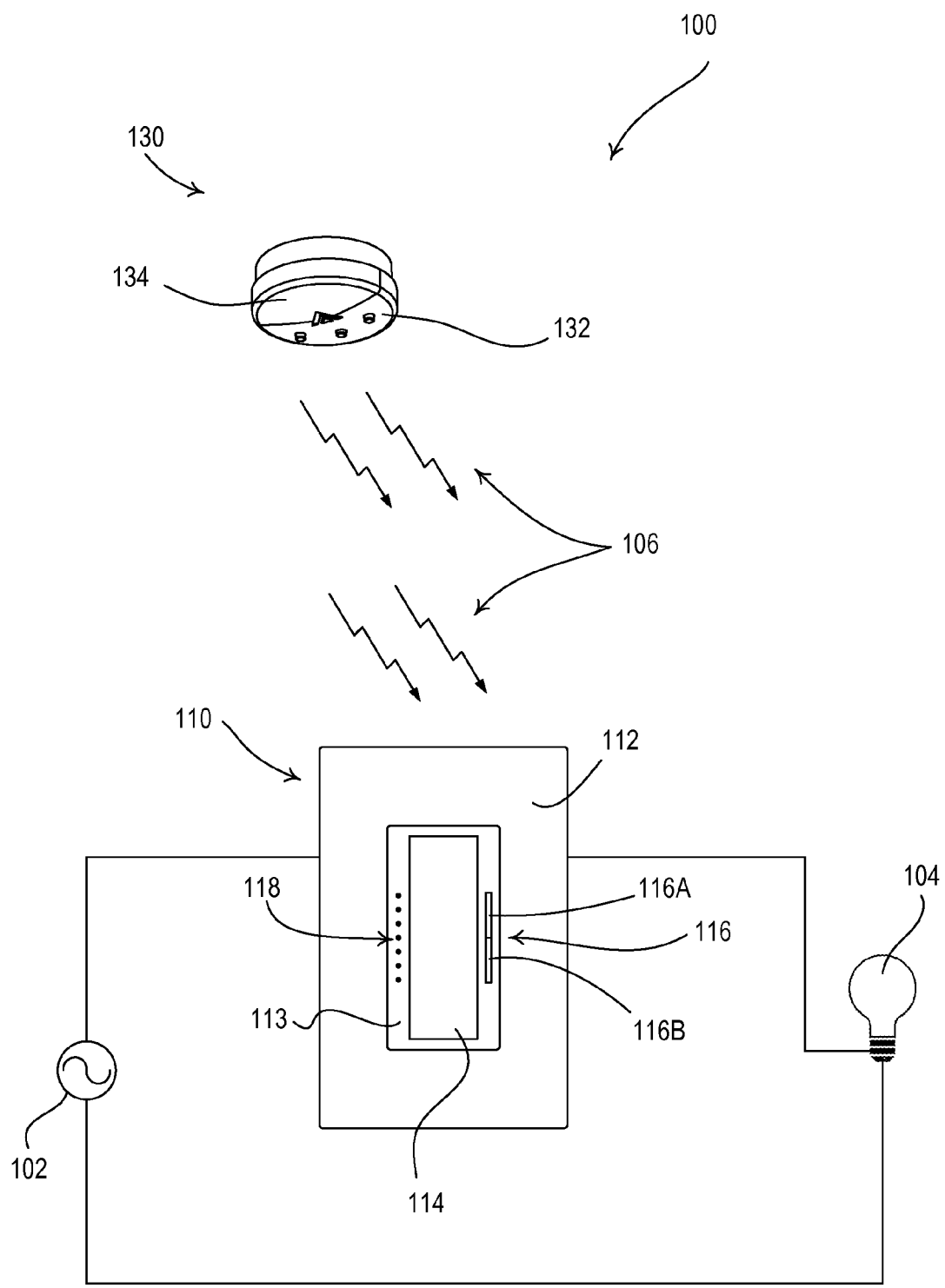
FIG. 2 is a simple diagram of a second configuration of the RF load control system of the first embodiment of the present invention, in which the system comprises a dimmer switch and a daylight sensor.

FIG. 2 is a simple diagram of a second configuration of the RF load control system 100, in which the system comprises the dimmer switch 110 and one daylight sensor 130. The daylight sensor 130 is mounted so as to measure a total light intensity $L_{T\text{-}SNSR}$ in the space around the daylight sensor (i.e., in the vicinity of the lighting load 104 controlled by the dimmer switch 110). The daylight sensor 130 includes an internal photosensitive circuit, e.g., a photosensitive diode, which is housed in an enclosure 132 having a lens 134 for conducting light from outside the daylight sensor towards the internal photosensitive diode. The daylight sensor 130 is responsive to the total light intensity $L_{T\text{-}SNSR}$ measured by the internal photosensitive circuit. Specifically, the daylight sensor 130 is operable to wirelessly transmit digital messages (i.e., wireless signals) to the dimmer switch 110 via the RF signals 106, such that the dimmer switch 110 controls the present light intensity $L_{PRES}$ of the lighting load 104 in response to the total light intensity $L_{T\text{-}SNSR}$ measured by the daylight sensor 130.

During the setup procedure of the second configuration of the RF load control system 100, the daylight sensor 130 is assigned to the dimmer switch 110. As mentioned above, the daylight sensor 130 transmits digital messages wirelessly via the RF signals 106 to the dimmer switch 110 in response to the total light intensity $L_{T\text{-}SNSR}$ measured by the daylight sensor. A digital message transmitted by the daylight sensor 130 includes, for example, a serial number associated with the daylight sensor and a value representative of the measured total light intensity $L_{T\text{-}SNSR}$ measured by the daylight sensor 130 (e.g., in foot-candles). The dimmer switch 110 is responsive to messages containing the serial numbers of the daylight sensor 130 to which the dimmer switch is assigned.

The dimmer switch 110 controls the present light intensity $L_{PRES}$ of the lighting load 104 in response to receiving a digital message with the total light intensity $L_{T\text{-}SNSR}$ as measured by the daylight sensor 130. The dimmer switch 110 may adjust the light intensity $L_{PRES}$ of the lighting load 104 to maintain the total light intensity $L_{T\text{-}SNSR}$ measured by the daylight sensor 130 at a setpoint intensity. In the second configuration of the RF load control system 100, the dimmer switch 110 is operable to turn off the lighting load 104 in response to the digital messages received from the daylight sensor 130. However, the dimmer switch 110 does not turn on the lighting load 104 in response to the digital messages received from the daylight sensor 130. The dimmer switch 110 only turns on the lighting load 104 in response to an actuation of the toggle actuator 114 or the intensity adjustment actuator 116. Examples of RF load control systems having daylight sensors are described in greater detail in commonly-assigned U.S. patent application Ser. No. 12/727,956, filed Mar. 19, 2010, entitled WIRELESS BATTERY-POWERED DAYLIGHT SENSOR, and U.S. patent application Ser. No. 12/727,923, filed Mar. 19, 2010, entitled METHOD OF CALIBRATING A DAYLIGHT SENSOR, the entire disclosures of which are hereby incorporated by reference.

Figure 3:
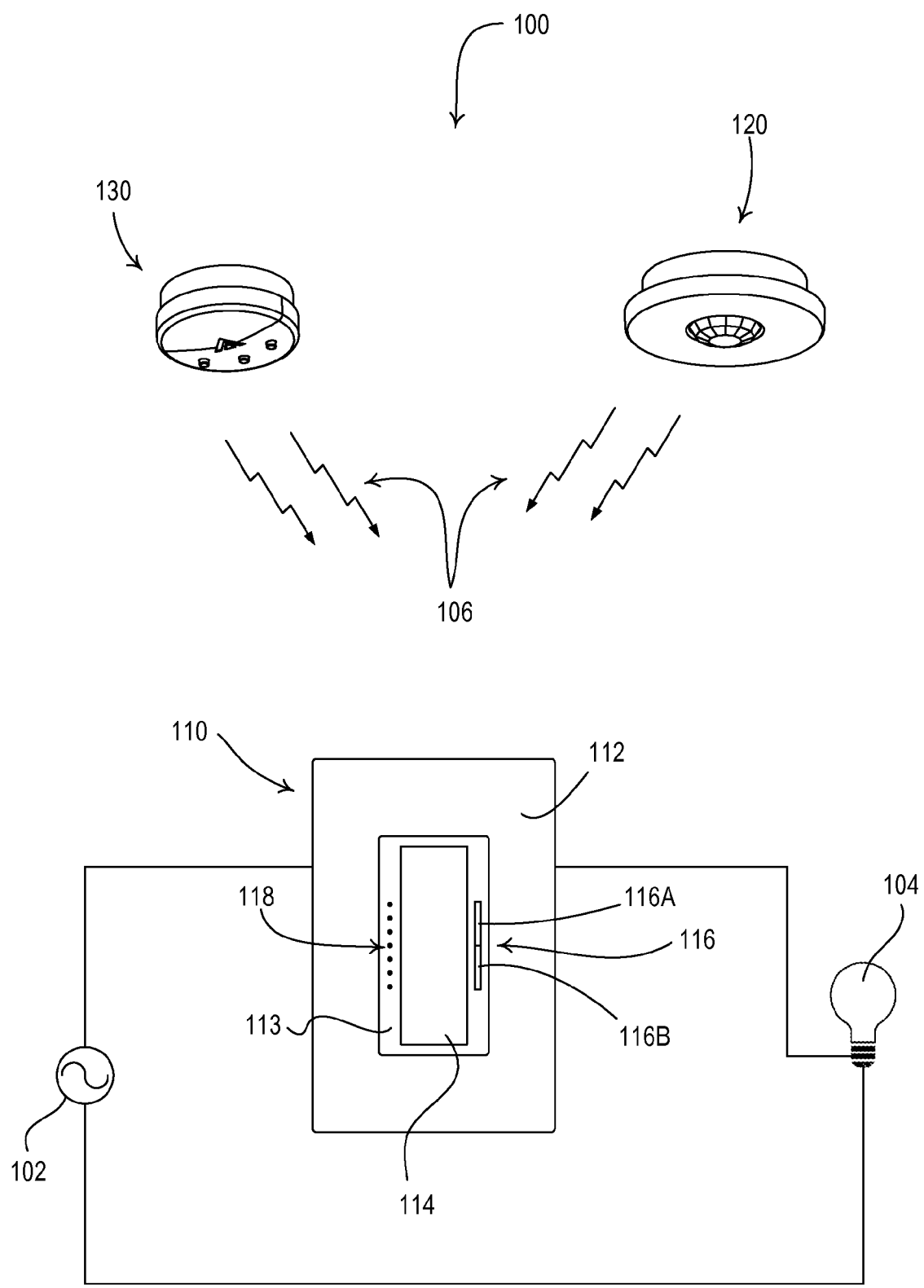
FIG. 3 is a simple diagram of a third configuration of the RF load control system of the first embodiment of the present invention, in which the system comprises a dimmer switch, an occupancy sensor, and a daylight sensor.

FIG. 3 is a simple diagram of a third configuration of the RF load control system 100, in which the system comprises the dimmer switch 110, one occupancy sensor 120, and one daylight sensor 130. Once again, the occupancy sensor 120 and the daylight sensor 130 are assigned to the dimmer switch 110 during the setup procedure of the RF load control system 100. The dimmer switch 110 is operable to automatically adjust how the dimmer switch 110 controls the lighting load 104 in response to the occupancy sensor 120 and the daylight sensor 130 when both a daylight sensor and an occupancy sensor are assigned to the dimmer switch 110. Specifically, in the third configuration of the RF load control system 100, the dimmer switch 110 is operable to turn the lighting load 104 on in response to the digital messages received from the daylight sensor 130 when the occupancy sensor 120 has determined that the space is occupied.

Alternatively, the dimmer switch 110 could be replaced with an electronic switch comprising, for example, a relay, for simply toggling the lighting load 104 on and off. The electronic switch could be adapted to simply turn the lighting load 104 on when the measured total light intensity $L_{T\text{-}SNSR}$ drops below a predetermined threshold (in the third configuration) and turn the lighting load off when the measured total light intensity $L_{T\text{-}SNSR}$ rises above approximately the predetermined threshold, for example, using some hysteresis (in the second and third configurations).

Figure 4:
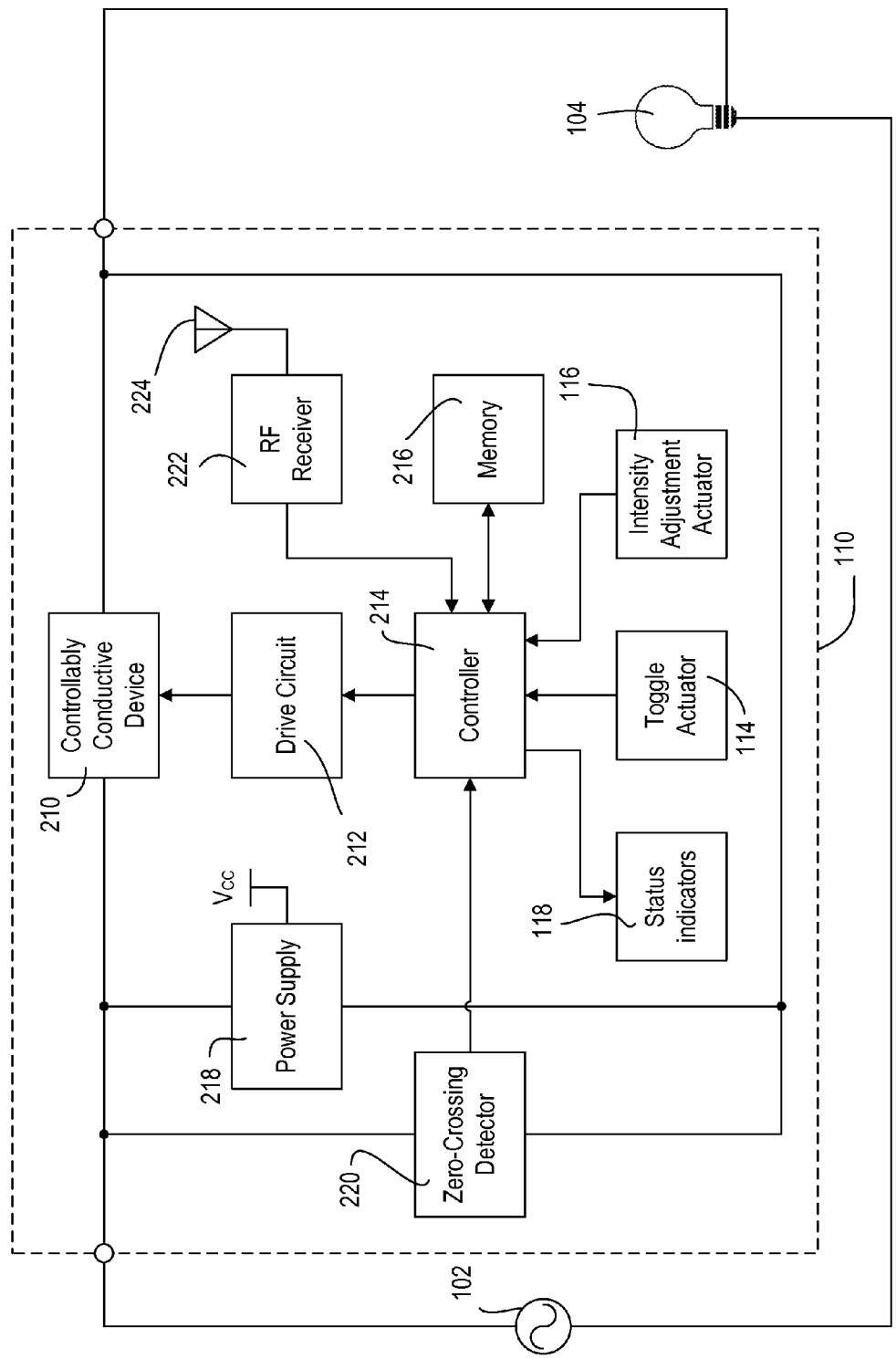
FIG. 4 is a simplified block diagram of a dimmer switch that may be used in the first, second, and third configurations of the RF load control system of the first embodiment of the present invention.

FIG. 4 is a simplified block diagram of the dimmer switch 110. The dimmer switch 110 comprises a controllably conductive device 210 coupled in series electrical connection between the AC power source 102 and the lighting load 104 for control of the power delivered to the lighting load. The controllably conductive device 210 may comprise any suitable type of bidirectional semiconductor switch, such as, for example, a triac, a field-effect transistor (FET) in a rectifier bridge, or two FETs in anti-series connection. The controllably conductive device 210 includes a control input coupled to a drive circuit 212. The input to the control input will render the controllably conductive device 210 conductive or non-conductive, which in turn controls the power supplied to the lighting load 104.

The drive circuit 212 provides control inputs to the controllably conductive device 210 in response to command signals from a controller 214. The controller 214 is preferably implemented as a microcontroller, but may be any suitable processing device, such as a programmable logic device (PLD), a microprocessor, or an application specific integrated circuit (ASIC). The controller 214 receives inputs from the toggle actuator 114 and the intensity adjustment actuator 116 and controls the status indicators 118. The controller 214 is also coupled to a memory 216 for storage of the preset intensity of lighting load 104 and the serial number of the occupancy sensors 120 and/or daylight sensors 130 to which the dimmer switch 110 is assigned. The memory 216 may be implemented as an external integrated circuit (IC) or as an internal circuit of the controller 214. A power supply 218 generates a direct-current (DC) voltage $V_{CC}$ for powering the controller 214, the memory 216, and other low-voltage circuitry of the dimmer switch 110.

A zero-crossing detector 220 determines the zero-crossings of the input AC waveform from the AC power supply 102. A zero-crossing is defined as the time at which the AC supply voltage transitions from positive to negative polarity, or from negative to positive polarity, at the beginning of each half-cycle. The zero-crossing information is provided as an input to controller 214. The controller 214 provides the control inputs to the drive circuit 212 to operate the controllably conductive device 210 (i.e., to provide voltage from the AC power supply 102 to the lighting load 104) at predetermined times relative to the zero-crossing points of the AC waveform.

The dimmer switch 110 further comprises an RF receiver 222 and an antenna 224 for receiving the RF signals 106 from the occupancy sensors 120 or the daylight sensor 130. The controller 214 is operable to control the controllably conductive device 210 in response to the messages received via the RF signals 106. Examples of the antenna 224 for a wall-mounted dimmer switch, such as the dimmer switch 110, are described in greater detail in commonly-assigned U.S. Pat. No. 5,982,103, issued Nov. 9, 1999, and U.S. Pat. No. 7,362,285, issued Apr. 22, 2008, both entitled COMPACT RADIO FREQUENCY TRANSMITTING AND RECEIVING ANTENNA AND CONTROL DEVICE EMPLOYING SAME. The entire disclosures of both are hereby incorporated by reference. Alternatively, the RF receiver 222 could comprise an RF transceiver for both receiving and transmitting the RF signals 106.

Figure 5:
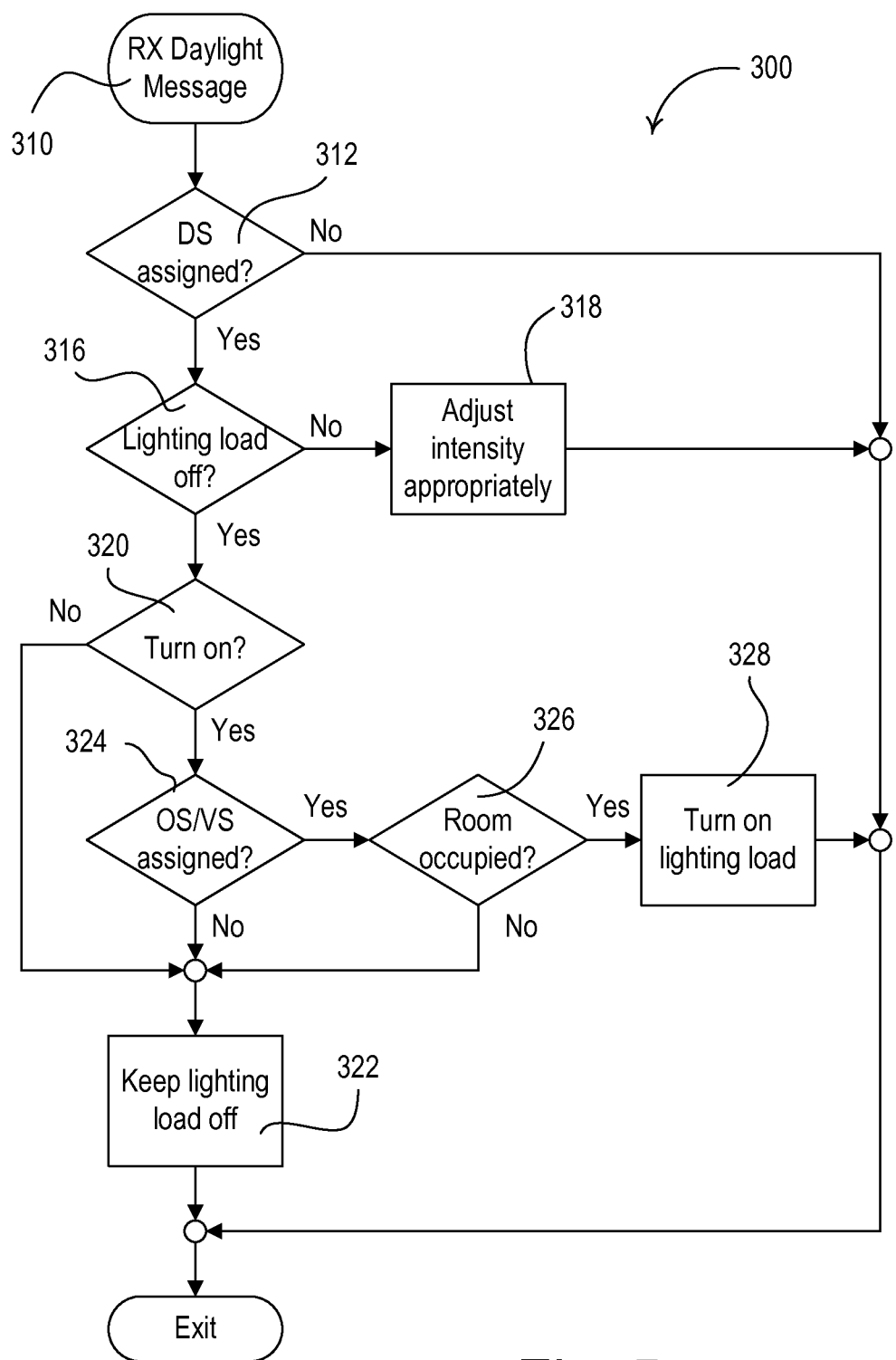
FIG. 5 is a simplified flowchart of a daylight sensor message procedure executed by a controller of the dimmer switch of FIG. 4 according to the first embodiment of the present invention when a digital message is received from a daylight sensor.

FIG. 5 is a simplified flowchart of a daylight sensor message procedure 300 executed by the controller 214 of the dimmer switch 110 according to the first embodiment of the present invention when a digital message is received from any daylight sensor 130 at step 310. If at least one daylight sensor 130 is assigned to the dimmer switch 110 at step 312 and the lighting load 104 is presently on at step 316, the controller 214 appropriately adjusts the present light intensity $L_{PRES}$ of the lighting load at step 318, before the daylight sensor message procedure 300 exits. If the lighting load 104 is off at step 316 and the lighting load 104 should not be turned on in response to the total light intensity $L_{T\text{-}SNSR}$ received from the daylight sensor 130 at step 320, the controller 214 keeps the lighting load 104 off at step 322 and the daylight sensor message procedure 300 exits. If the lighting load 104 should be turned on in response to the daylight sensor 130 at step 320, the controller 214 determines if at least one occupancy or vacancy sensor 120 is assigned to the dimmer switch 110 at step 324. If not, the controller 214 keeps the lighting load 104 off at step 322 and the daylight sensor message procedure 300 exits. If at least one occupancy or vacancy sensor 120 is assigned to the dimmer switch 110 at step 324 and the space is occupied at step 326, the controller 214 turns on the lighting load 104 at step 328, before the daylight sensor message procedure 300 exits. If the space is not occupied at step 326, the controller 214 keeps the lighting load 104 off at step 322 and the daylight sensor message procedure 300 exits.

According to a second embodiment of the present invention, an RF load control system 400 comprises a remote switching pack 410 and one or more RF transmitters, such as remote occupancy sensors 420, remote daylight sensors 430, and remote controls (RC) 440. The remote switching pack 410 is adapted to be remotely mounted, for example, to a junction box above a ceiling or in an electrical closet, such that the remote switching pack is not easily accessible by a user. As in the first embodiment, the remote switching pack 410 is operable to automatically adjust how the remote switching pack operates in response to the types of RF transmitters (i.e., occupancy sensors, daylight sensors, and remote controls) that are assigned to the remote switching pack as will be described in greater detail below.

Figure 6:
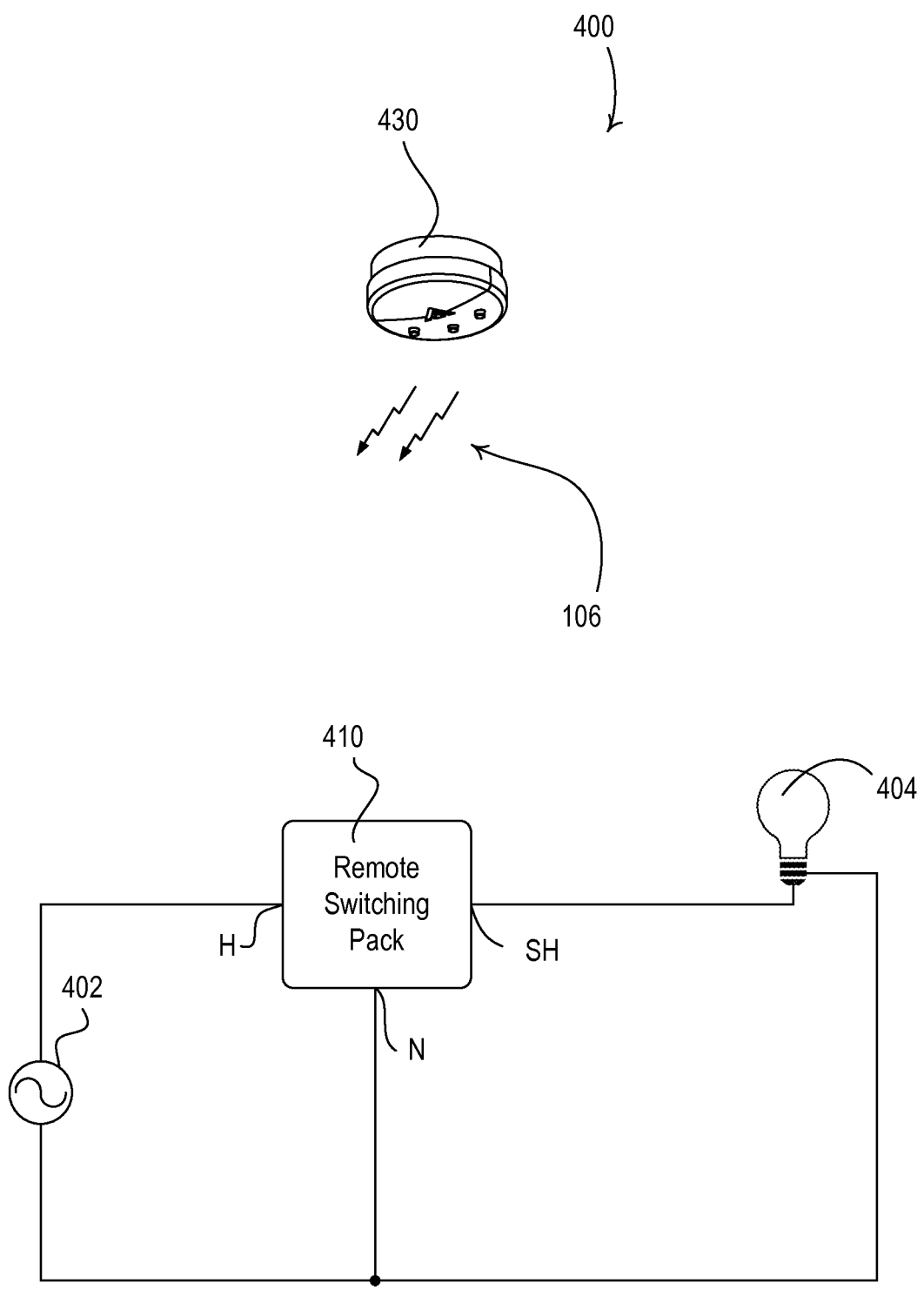
FIG. 6 is a simple diagram of a first configuration of an RF load control system according to a second embodiment of the present invention, in which the system comprises a remote switching pack and a daylight sensor.

FIG. 6 is a simple diagram of a first configuration of the RF load control system 400, in which the system comprises the remote switching pack 410 and a single daylight sensor 430. The remote switching pack 410 is coupled to an AC power source 402 via a hot terminal H and a neutral terminal N and to a lighting load 404 via a switched hot terminal SH. The remote switching pack 410 comprises a controllably conductive device, such as, for example, a relay or a bidirectional semiconductor switch, that is coupled in series electrical connection between the AC power source 402 and the lighting load 404 for turning the lighting load on and off. Alternatively, the remote switching pack 410 could comprise a dimming circuit for adjusting the intensity of the lighting load 404. In the first configuration of the RF load control system 400 of the second embodiment, the remote switching pack 410 is operable to turn the lighting load 404 on and off in response to the digital messages received from the daylight sensor 430 via the RF signals 106.

Figure 7:
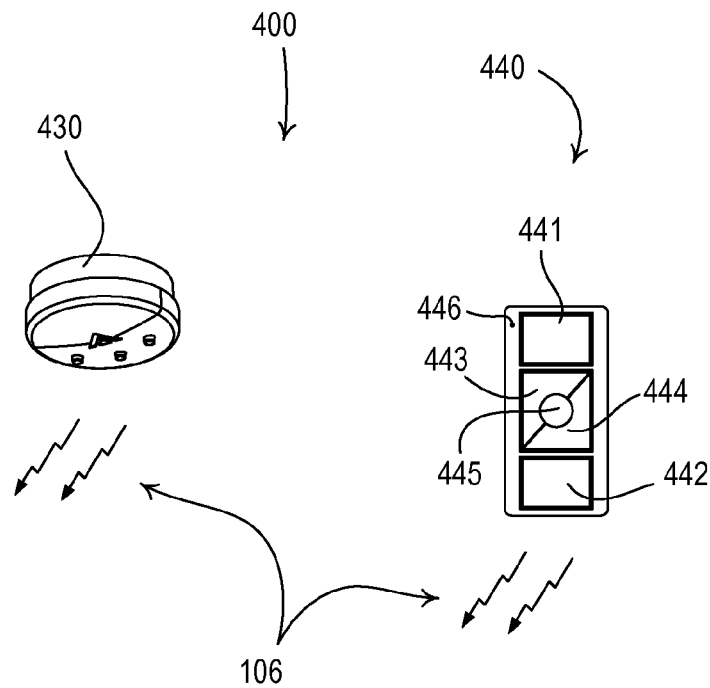
FIG. 7 is a simple diagram of a second configuration of the RF load control system of the second embodiment of the present invention, in which the system comprises a remote switching pack, a daylight sensor, and a remote control.
Figure 7:
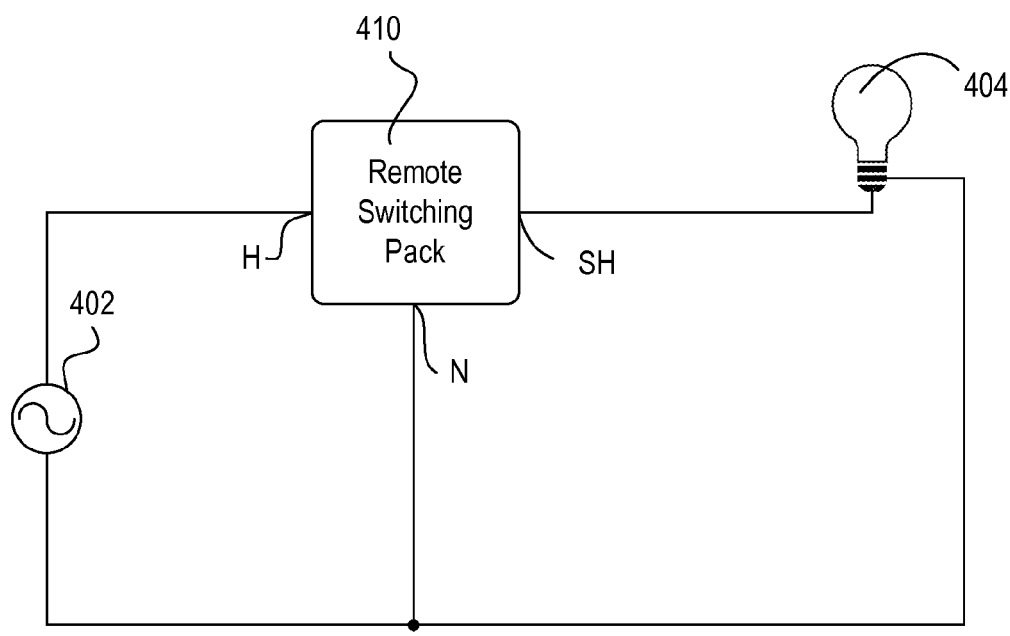

FIG. 7 is a simple diagram of a second configuration of the RF load control system 400, in which the system comprises the remote switching pack 410, a daylight sensor 430, and a remote control 440. The remote control 440 comprises an on button 441, an off button 442, a raise button 443, a lower button 444, and a preset button 445. The remote control 440 also has a visual indicator 446, which may be illuminated in response to the actuation of one of the buttons 441-445. The remote control 440 is operable to transmit digital messages including commands to control the lighting load 404 to the remote switching pack 410 in response to actuations of the buttons 441-445. In the second configuration of the RF load control system 400 of the second embodiment, the remote switching pack 410 does not turn on the lighting load 404 in response to the digital messages received from the daylight sensor 430. The remote switching pack 410 is operable to turn off the lighting load 404 in response to the digital messages received from the daylight sensor 430, but is only operable to turn on the lighting load in response to the digital message received from the remote control 440.

Figure 8:
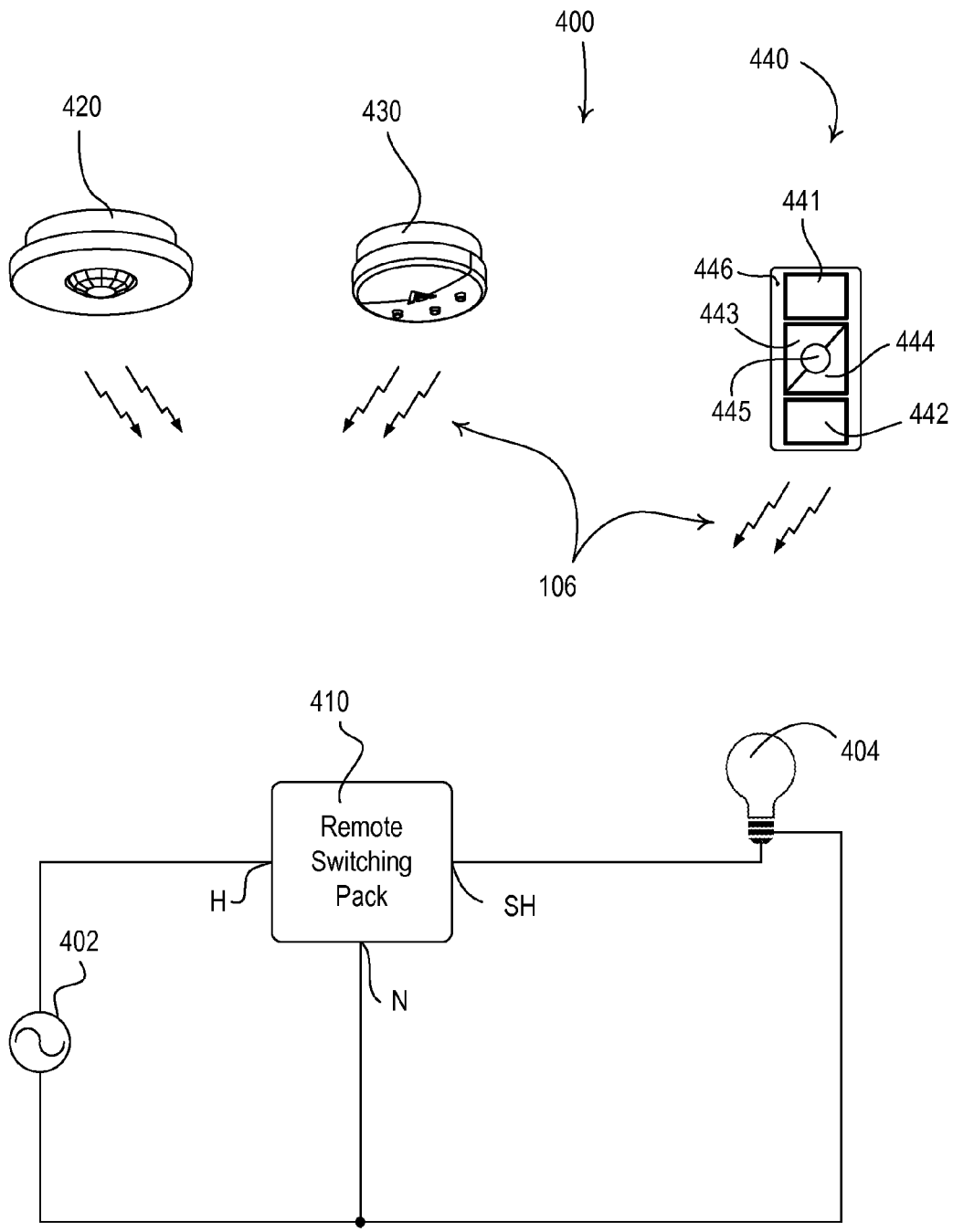
FIG. 8 is a simple diagram of a third configuration of the RF load control system of the second embodiment of the present invention, in which the system comprises a remote switching pack, a daylight sensor, an occupancy sensor, and a remote control.

FIG. 8 is a simple diagram of a third configuration of the RF load control system 400, in which the system comprises the remote switching pack 410, an occupancy sensor 420, a daylight sensor 430, and a remote control 440. The remote switching pack 410 is operable to turn on the lighting load 404 in response to the digital messages received from the daylight sensor 430 only when the occupancy sensor 420 has determined that the space is occupied.

Figure 9:
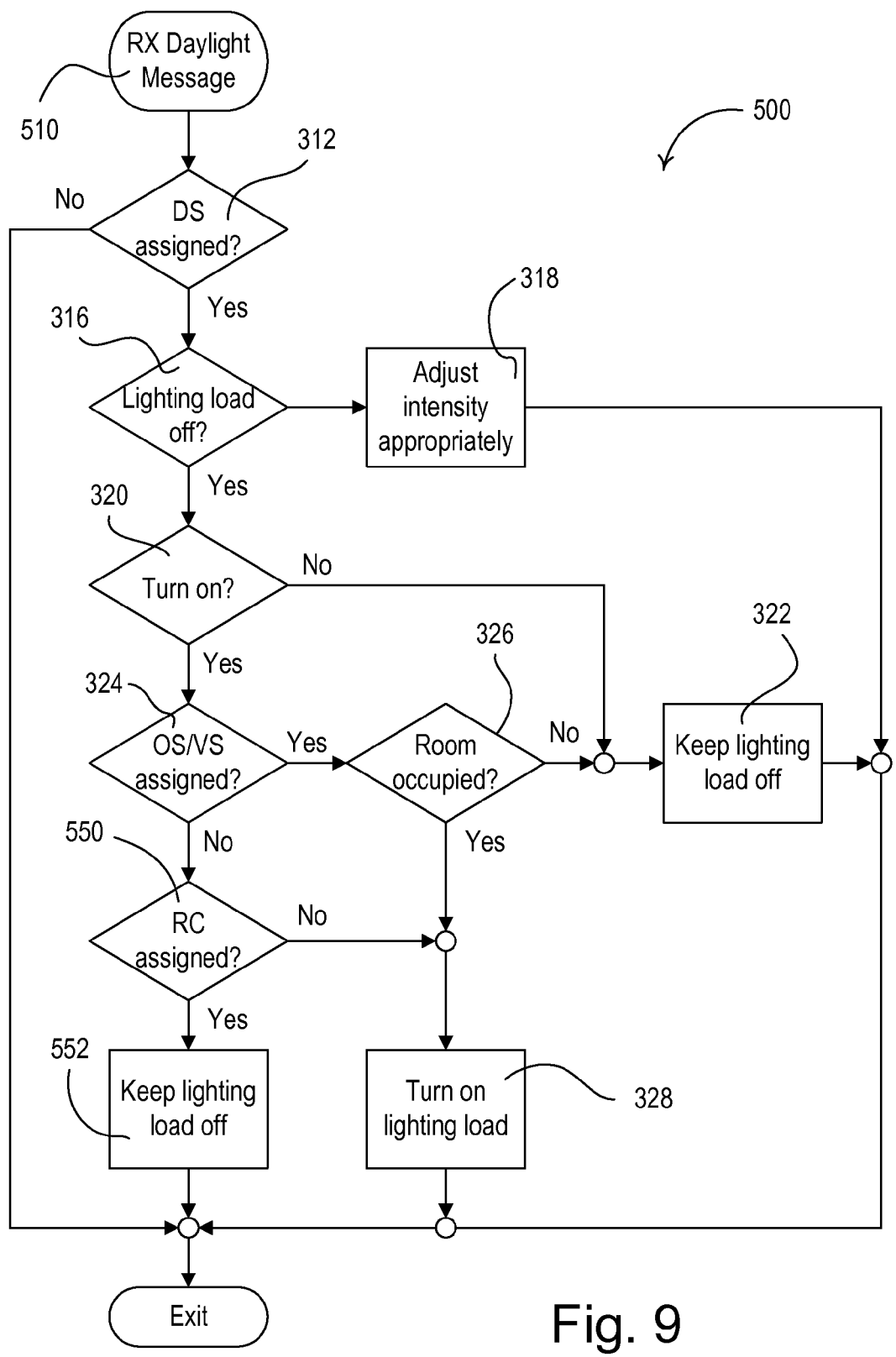
FIG. 9 is a simplified flowchart of a daylight sensor message procedure executed by the remote switching pack of the first, second, and third configurations of the RF load control system of the first embodiment of the present invention when a digital message is received from a daylight sensor.

FIG. 9 is a simplified flowchart of a daylight sensor message procedure 500 executed by a controller of the remote switching pack 410 according to the second embodiment of the present invention whenever a digital message is received from any daylight sensor 430 at step 510. The daylight sensor message procedure 500 of the second embodiment is very similar to the daylight sensor message procedure 300 of the first embodiment. However, if no occupancy or vacancy sensors 420 are assigned to the remote switching pack 410 at step 324, the remote switching pack determines if any remote controls 440 are assigned to the remote switching pack at step 550. If so, the remote switching pack 410 does not turn the lighting load 404 on, but maintains the lighting load off at step 552, before the daylight sensor message procedure 500 exits. If there are no remote controls 440 assigned to the remote switching pack at step 550, the remote switching pack 410 turns on the lighting load 404 in response to the digital message received from the daylight sensor 430 at step 328 and the daylight sensor message procedure 500 exits.

While the present invention has been described with reference to the dimmer switch 110 and the remote switching pack 410 for controlling the power delivered to a connected lighting load, the concepts of the present invention could be used in any type of control device of a load control system, such as, for example, a wall-mounted electronic switch for turning on and off a lighting load (such as an incandescent lamp, a magnetic low-voltage lighting load, an electronic low-voltage lighting load, and a screw-in compact fluorescent lamp); a controllable circuit breaker, or other switching device for turning appliances on and off; a screw-in luminaire that includes a light source and an integral load regulation circuit; a plug-in load control device, controllable electrical receptacle, or controllable power strip for each controlling one or more plug-in loads; a controllable screw-in module adapted to be screwed into the electrical socket (e.g., an Edison socket) of a lamp; an electronic dimming ballast for a fluorescent load; a driver for a light-emitting diode (LED) light source; a motor control unit for controlling a motor load, such as a ceiling fan or exhaust fan; a drive unit for controlling a motorized window treatment or projection screen; motorized interior or exterior shutters; a thermostat for a heating and/or cooling system; a temperature control device for controlling a setpoint temperature of a heating, ventilation, and air conditioning (HVAC) system; an air conditioner; a compressor; an electric baseboard heater controller; a controllable damper; a variable air volume controller; a hydronic valve for use with a radiator and a radiant heating system; a humidity control unit; a dehumidifier; a water heater; a pool pump; an audio system or amplifier; a generator; an electric charger, such as an electric vehicle charger; and an alternative energy controller. In addition, the RF load control systems 100, 400 could comprise other types of transmitters, such as, for example, a wireless temperature sensor, a humidity sensor, a security sensor, a proximity sensor, a wall-mounted keypad device, a tabletop keypad device, a visual display device, a key fob, a cell phone, a smart phone, a tablet, a personal digital assistant, a personal computer, a timeclock, an audio-visual control, a safety device, a central control transmitter, or any suitable RF-transmitting device.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A load control system for controlling an electrical load, the load control system comprising:
   a first transmitter operable to wirelessly transmit a first digital message;
   a second transmitter operable to wirelessly transmit a second digital message; and
   a load control device for controlling the load, the load control device operable to be associated with one or both of the first and second transmitters, the load control device responsive to the first digital message if the load control device is associated with the first transmitter and to the second digital message if the load control device is associated with the second transmitter;
   wherein the load control device automatically operates in a first mode of operation if only the first transmitter is associated with the load control device, and automatically operates in a second mode of operation if both the first and second transmitters are associated with the load control device.

2. The load control system of claim 1, wherein the load control device is adapted to be coupled in series electrical connection between the source and the load for controlling the amount of power delivered from the source to the load.

3. The load control system of claim 2, wherein the electrical load comprises a lighting load, the first transmitter comprises a daylight sensor, and the second transmitter comprises an occupancy sensor.

4. The load control system of claim 3, wherein the load control device comprises an actuator for turning the lighting load on and off.

5. The load control system of claim 4, wherein the load control device does not turn on the lighting load in response to the first digital message transmitted by the daylight sensor in the first mode of operation when only the daylight sensor is associated with the load control device.

6. The load control system of claim 5, wherein the load control device is operable to determine if a space in which the electrical load is located is occupied in response to the second digital message transmitted by the occupancy sensor.

7. The load control system of claim 6, wherein the load control device turns the lighting load on and off in response to the first digital message transmitted by the daylight sensor in the second mode of operation when both the daylight sensor and the occupancy sensor are associated with the load control device and the load control device has determined that the space in which the lighting load is located is occupied.

8. The load control system of claim 5, wherein the load control device turns on the lighting load in response to an actuation of the actuator in the first mode of operation when only the daylight sensor is associated with the load control device.

9. The load control system of claim 5, wherein the load control device comprises one of a wall-mountable electronic switch and a wall-mountable dimmer switch.

10. The load control system of claim 2, wherein the electrical load comprises a lighting load, the first transmitter comprises a daylight sensor, and the second transmitter comprises a remote control.

11. The load control system of claim 10, wherein the load control device turns the lighting load on and off in response to the first digital message transmitted by the daylight sensor in the first mode of operation when only the daylight sensor is associated with the load control device.

12. The load control system of claim 11, wherein the load control device does not turn on the lighting load in response to the first digital message transmitted by the daylight sensor in the second mode of operation when both the daylight sensor and the remote control are associated with the load control device.

13. The load control system of claim 12, wherein the load control device turns on the lighting load in response to the second digital message transmitted by the remote control in the second mode of operation when both the daylight sensor and the remote control are associated with the load control device.

14. The load control system of claim 13, wherein the load control device comprises a remote switching pack.

15. A load control device for use in a load control system for controlling an electrical load in response to first and second transmitters, the load control device comprising:
   a wireless communication circuit adapted to receive a first digital message from the first transmitter and a second digital message from the second transmitter; and
   a controller adapted to be associated with one or both of the first and second transmitters, the controller responsive to the first digital message if the load control device is associated with the first transmitter and to the second digital message if the load control device is associated with the second transmitter;
   wherein the controller automatically operates in a first mode of operation if only the first transmitter is associated with the load control device, and automatically operates in a second mode of operation if both the first and second transmitters are associated with the load control device.

16. The load control device of claim 15, further comprising:
   an actuator for turning the electrical load on and off.

17. The load control device of claim 16, wherein the load control device does not turn on the electrical load in response to the first digital message transmitted by the first transmitter in the first mode of operation when only the first transmitter is associated with the load control device.

18. The load control device of claim 17, wherein the load control device is operable to determine if a space in which the electrical load is located is occupied in response to the second digital message transmitted by the second transmitter.

19. The load control device of claim 18, wherein the load control device turns the electrical load on and off in response to the first digital message transmitted by the first transmitter in the second mode of operation when both the first transmitter and the second transmitter are associated with the load control device and the load control device has determined that the space in which the electrical load is located is occupied.

20. The load control device of claim 17, wherein the load control device turns on the electrical load in response to an actuation of the actuator in the first mode of operation when only the first transmitter is associated with the load control device.

21. The load control device of claim 15, wherein the load control device turns the electrical load on and off in response to the first digital message transmitted by the first transmitter in the first mode of operation when only the first transmitter is associated with the load control device.

22. The load control device of claim 21, wherein the load control device does not turn on the electrical load in response to the first digital message transmitted by the first transmitter in the second mode of operation when both the first and second transmitters are associated with the load control device.

23. The load control device of claim 22, wherein the load control device turns on the electrical load in response to the second digital message transmitted by the second transmitter in the second mode of operation when both the first and second transmitters are associated with the load control device.

24. The load control device of claim 15, further comprising:
   a controllably conductive device adapted to be coupled in series electrical connection between the source and the load for controlling the amount of power delivered from the source to the load.

25. The load control device of claim 24, wherein the load control device comprises one of a wall-mountable dimmer switch, a wall-mountable electronic switch, and a remote switching pack.

26. A load control system for controlling the amount of power delivered from an AC power source to a lighting load, the load control system comprising:
   a daylight sensor operable to wirelessly transmit a first digital message;
   an occupancy sensor operable to wirelessly transmit a second digital message; and
   a load control device adapted to be coupled in series electrical connection between the source and the lighting load and comprising an actuator for turning the lighting load on and off, the load control device operable to be associated with one or both of the daylight sensor and the occupancy sensor, the load control device responsive to the first digital message if the load control device is associated with the daylight sensor and to the second digital message if the load control device is associated with the occupancy sensor;
   wherein the load control device automatically operates in a first mode of operation if only the daylight sensor is associated with the load control device, and automatically operates in a second mode of operation if both the daylight sensor and the occupancy sensor are associated with the load control device, such that the load control device does not turn on the lighting load in response to the first digital message transmitted by the daylight sensor in the first mode of operation when only the daylight sensor is associated with the load control device.

27. The load control system of claim 26, wherein the load control device is operable to determine if a space in which the electrical load is located is occupied in response to the second digital message transmitted by the occupancy sensor.

28. The load control system of claim 27, wherein the load control device turns the lighting load on and off in response to the first digital message transmitted by the daylight sensor in the second mode of operation when both the daylight sensor and the occupancy sensor are associated with the load control device and the load control device has determined that the space in which the lighting load is located is occupied.

29. The load control system of claim 26, wherein the load control device turns on the lighting load in response to an actuation of the actuator in the first mode of operation when only the daylight sensor is associated with the load control device.

30. The load control system of claim 26, wherein the load control device comprises one of a wall-mountable electronic switch and a wall-mountable dimmer switch.

31. A load control system for controlling the amount of power delivered from an AC power source to a lighting load, the load control system comprising:
- a daylight sensor operable to wirelessly transmit a first digital message;
- a remote control operable to wirelessly transmit a second digital message; and
- a load control device adapted to be coupled in series electrical connection between the source and the lighting load, the load control device operable to be associated with one or both of the daylight sensor and the remote control, the load control device responsive to the first digital message if the load control device is associated with the daylight sensor and to the second digital message if the load control device is associated with the remote control;
- wherein the load control device automatically operates in a first mode of operation if only the daylight sensor is associated with the load control device, and automatically operates in a second mode of operation if both the daylight sensor and the remote control are associated with the load control device, the load control device turning the lighting load on and off in response to the first digital message transmitted by the daylight sensor in the first mode of operation when only the daylight sensor is associated with the load control device.

32. The load control system of claim 31, wherein the load control device does not turn on the lighting load in response to the first digital message transmitted by the daylight sensor in the second mode of operation when both the daylight sensor and the remote control are associated with the load control device.

33. The load control system of claim 32, wherein the load control device turns on the lighting load in response to the second digital message transmitted by the remote control in the second mode of operation when both the daylight sensor and the remote control are associated with the load control device.

34. The load control system of claim 31, wherein the load control device comprises a remote switching pack.

* * * * *